United States Patent
Cox et al.

(10) Patent No.: US 10,417,921 B2
(45) Date of Patent: Sep. 17, 2019

(54) DISPLAY OF INTENSITY PROFILE DISCS

(71) Applicant: GE Aviation Systems Limited, Cheltenham, Gloucestershire (GB)

(72) Inventors: Stephen Christopher Cox, Cheltenham (GB); Roger Lee, Cheltenham (GB); Trevor Marc Yates, Cheltenham (GB)

(73) Assignee: GE Aviation Systems Limited, Cheltenham, Glouchestershire (GB)

(*) Notice: Subject to any disclaimer, the term of this patent is extended or adjusted under 35 U.S.C. 154(b) by 44 days.

(21) Appl. No.: 15/654,085

(22) Filed: Jul. 19, 2017

(65) Prior Publication Data
US 2018/0025652 A1 Jan. 25, 2018

(30) Foreign Application Priority Data
Jul. 19, 2016 (GB) .................................. 1612493.5

(51) Int. Cl.
| | |
|---|---|
| G01C 23/00 | (2006.01) |
| G08G 5/02 | (2006.01) |
| G09G 5/00 | (2006.01) |
| G06F 3/14 | (2006.01) |
| G09G 5/02 | (2006.01) |
| G09G 5/10 | (2006.01) |

(52) U.S. Cl.
CPC .............. *G08G 5/025* (2013.01); *G06F 3/14* (2013.01); *G09G 5/02* (2013.01); *G09G 5/10* (2013.01); *G01C 23/00* (2013.01); *G09G 2320/0686* (2013.01); *G09G 2340/12* (2013.01); *G09G 2380/12* (2013.01)

(58) Field of Classification Search
USPC .......................................................... 701/4
See application file for complete search history.

(56) References Cited

U.S. PATENT DOCUMENTS

| | | | | |
|---|---|---|---|---|
| 5,261,030 A | * | 11/1993 | Brooke ................. | G06T 11/203 345/639 |
| 5,287,451 A | * | 2/1994 | Favot ....................... | G09G 3/20 345/501 |
| 5,557,297 A | * | 9/1996 | Sharp ....................... | G09G 5/20 345/614 |

(Continued)

FOREIGN PATENT DOCUMENTS

| | | |
|---|---|---|
| EP | 0 780 796 A1 | 6/1997 |
| EP | 0 546 780 B1 | 7/1997 |

(Continued)

OTHER PUBLICATIONS

Combined Search and Examination Report issued in connection with corresponding GB Application No. 1612493.5 dated Dec. 29, 2016.

*Primary Examiner* — Wesner Sajous
(74) *Attorney, Agent, or Firm* — Dority & Manning, P.A.

(57) ABSTRACT

According to an example, coordinates in a coordinate space of a display device at which a line is to be displayed may be determined. A first set of intensity profile discs corresponding to the determined coordinates and a second set of intensity profile discs having inverted intensity profiles from the first set of intensity profile discs may be identified. The identified second set of intensity profile discs may be displayed at the determined coordinates on the display device and the identified first set of intensity profile discs may be displayed over the displayed second set of intensity profile discs on the display device.

20 Claims, 8 Drawing Sheets

(56) References Cited

U.S. PATENT DOCUMENTS

| | | | |
|---|---|---|---|
| 5,596,684 | A | 1/1997 | Ogletree et al. |
| 6,307,566 | B1 | 10/2001 | Hill et al. |
| 6,693,615 | B2 | 2/2004 | Hill et al. |
| 7,342,512 | B2 | 3/2008 | Hedrick |
| 7,659,903 | B2 | 2/2010 | Hedrick |
| 7,724,259 | B2 | 5/2010 | Hedrick et al. |
| 7,724,260 | B2 | 5/2010 | Hancock et al. |
| 8,487,952 | B2 | 7/2013 | Hancock |
| 2004/0027617 | A1* | 2/2004 | Ishihara ................. G06K 15/00 358/3.13 |
| 2008/0270970 | A1* | 10/2008 | Shiraishi ............. G03F 7/70683 716/50 |
| 2010/0002003 | A1* | 1/2010 | Yamauchi ............. G06T 11/203 345/441 |

FOREIGN PATENT DOCUMENTS

| | | |
|---|---|---|
| JP | H04-280383 A | 10/1992 |
| JP | 2005-039802 A | 2/2005 |
| WO | 2000/057364 A1 | 9/2000 |
| WO | 2000/067196 A1 | 11/2000 |

\* cited by examiner

DISPLAY OF INTENSITY PROFILE DISCS

BACKGROUND

Color display devices are used in most electronic systems and devices that display still and video images. One type of electronic system in which a color display device is used is an aircraft system, such as an avionics video display that displays various types of information. For instance, an avionics video display may display information pertaining to guidance and navigation, flight planning, and flight information. The flight information may include a roll pointer, a slip skid indicator, and a pitch ladder.

BRIEF DESCRIPTION OF THE INVENTION

According to an embodiment of a computer-implemented method for displaying intensity profile discs, the method comprises determining, by a processor, coordinates in a coordinate space of a display device at which a line is to be displayed; identifying, by the processor, a first set of intensity profile discs corresponding to the determined coordinates; identifying, by the processor, a second set of intensity profile discs having inverted intensity profiles from the identified first set of intensity profile discs; displaying, by the processor, the selected second set of intensity profile discs at the determined coordinates on the display device; and displaying, by the processor, the identified first set of intensity profile discs over the displayed second set of intensity profile discs on the display device.

According to an embodiment of a computing apparatus comprise a processor; and a non-transitory computer readable medium on which is stored computer readable instructions. When the computer readable instructions are executed cause the processor to determine coordinates in a coordinate space of a display device at which a line is to be displayed; identify a first set of intensity profile discs corresponding to the determined coordinates; identify a second set of intensity profile discs, wherein the second set of intensity profile discs is inverted with respect to the identified first set of intensity profile discs; cause the identified second set of intensity profile discs to be displayed at the determined coordinates on the display device; and cause the identified first set of intensity profile discs to be displayed on top of the displayed second set of intensity profile discs on the display device.

According to an embodiment comprises a non-transitory computer readable medium on which is stored computer readable instructions. When the computer readable instructions are executed by a processor, cause the processor to: determine coordinates in a coordinate space of a display device at which a line is to be displayed; identify a set of intensity profile discs corresponding to the determined coordinates; determine whether the line has a color other than white and is to be displayed directly on a background section that has a color other than black; and in response to a determination that the line has a color other than white and is to be displayed directly on a background section that has a color other than black, identify a set of inverted intensity profile discs having inverted intensity profiles with respect to the identified set of intensity profile discs; cause the identified set of inverted intensity profile discs to be displayed at the determined coordinates on the display device; and cause the identified set of intensity profile discs to be displayed on top of the displayed set of inverted intensity profile discs on the display device.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
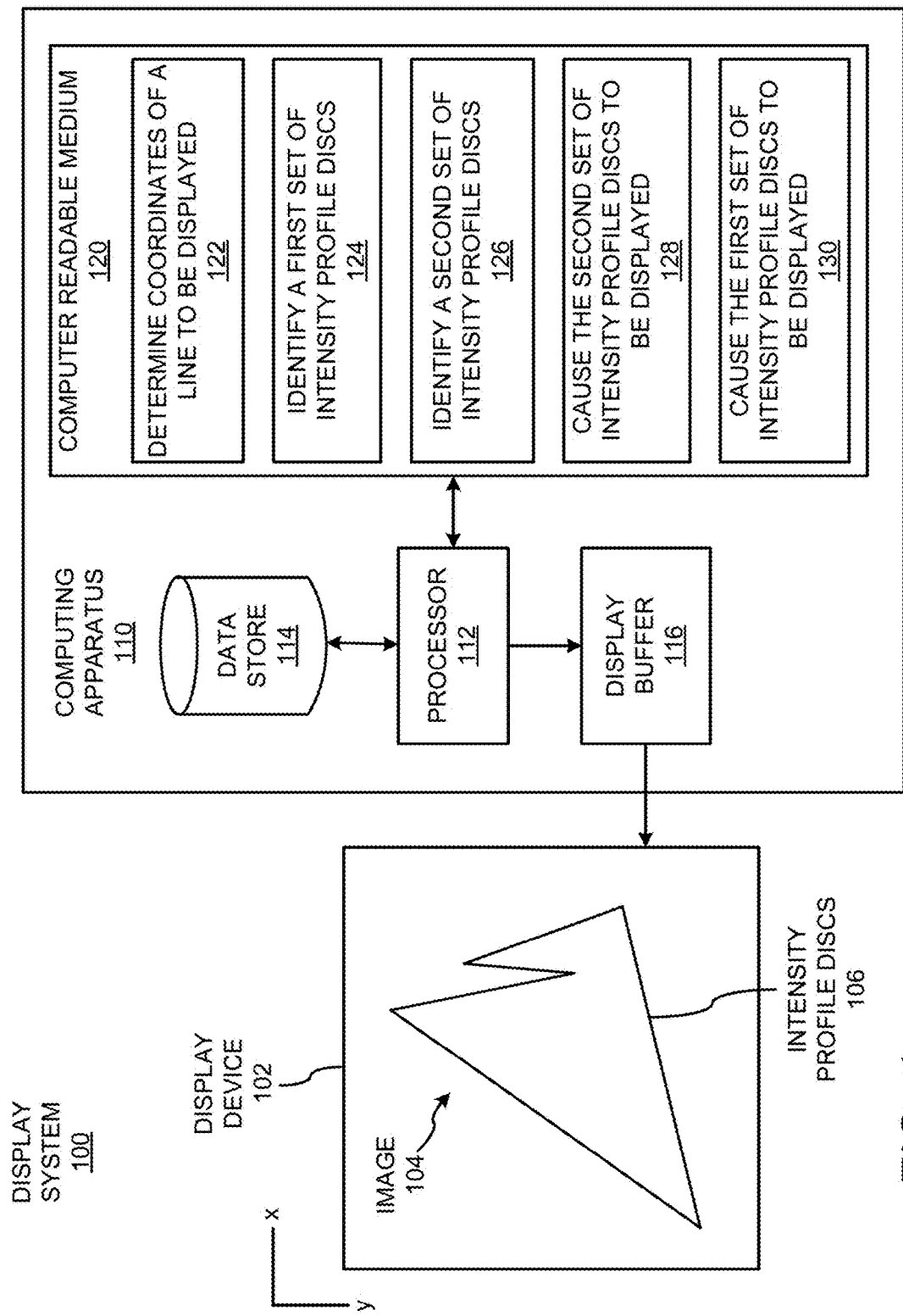
FIG. 1 shows a simplified block diagram of a display system.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are apparatuses and methods for displaying images with intensity profile discs on a display device. The apparatuses and methods disclosed herein may include the identification (e.g., selection and/or generation) of a first set of intensity profile discs that is to be displayed in place of a line on the display device. The intensity profile discs may generally be defined as bitmap patterns that may have sizes ranging from, for instance, about 3×3 pixels to about 6×6 pixels depending upon, for instance, the size of the line that the intensity profile discs are to replace. The intensity profile discs may be generally circular shaped with low intensity pixels close to the circumference and high intensity pixels at the center. In addition, the first set of intensity profile discs may be selected from a group of intensity profile discs, in which the intensity profile discs in the group have different central locations with respect to each other on a grid. That is, the central locations of each of the intensity profile discs in the group may have different sub-pixel components (e.g., x and y coordinates) with respect to each other, in which the sub-pixel components may be normalized between 0 and 1 for two orthogonal axes of a coordinate system. In addition, the intensity profile discs in the group that have sub-pixel components that closely match the sub-pixel fractional components of positions of the line may be selected to be included in the first set of intensity profile discs.

The apparatuses and methods disclosed herein may also include the identification (e.g., selection and/or generation) of a second set of intensity profile discs, in which the intensity profile discs in the second set may be inverted from the intensity profile discs in the first set. That is, the intensity profile discs in the second set may be inverted versions of respective intensity profile discs in the first set. In this regard, the intensity profile discs in the second set may have high intensity pixels close to the circumferences and low intensity pixels at the centers. According to an example, the centers of the intensity profile discs in the second set may have a relatively dark or black color.

The apparatuses and methods disclosed herein may further include the display of the second set of intensity profile discs and the display of the first set of intensity profile discs over the second set of intensity profile discs. Because each of the intensity profile discs in the second set corresponds to a position of the line, e.g., a particular pixel location at which the position of the line is to be displayed, and the intensity profile discs are larger than the pixels, the intensity profile discs may overlap neighboring ones of the intensity profile discs when displayed. For instance, the intensity profile discs may be offset from each other at a resolution of one pixel or one sub-pixel.

By displaying the second set of intensity profile discs prior to displaying the first set of intensity profile discs, the first set of intensity profile discs may be displayed on a dark or black background. In one regard, display of the first set of intensity profile discs on the dark or black background may result in the color of the first set of intensity profile discs being a more accurate representation of the color of the line which the intensity profile discs are replacing. That is, saturation of the colors of the first set of intensity profile discs with the colors of the background sections on which the intensity profile discs are displayed may be avoided.

Additionally, through display of the first set of intensity profile discs instead of displaying a line by filling pixels of the display device, an image may be displayed with smoother appearing lines, edges, and corners. In other words, images may be displayed with anti-aliased lines, edges, and corners.

With reference first to FIG. 1, there is shown a simplified block diagram of a display system 100 in which features of the methods and apparatuses disclosed herein may be implemented, according to an example. It should be understood that the display system 100 depicted in FIG. 1 may include additional components and that some of the components described herein may be removed and/or modified without departing from a scope of the display system 100 disclosed herein.

As shown in FIG. 1, the display system 100 may include a display device 102, which may be a screen, a monitor, or other type of digital display that is to display an image 104, such as a video image. By way of example, the display device 102 may be a flat panel, color, active matrix display screen, such as a liquid crystal display (LCD), a plasma display, a light emitting diode (LED) display, a digital light projector (DLP) display, or the like. In a particular example, the display device 102 is an avionics video display and may display any of a roll pointer, a slip skid indicator, a pitch ladder, combinations thereof, or the like. As discussed in greater detail herein, at least one of the lines forming the image 104 may be displayed as a set of overlapping intensity profile discs 106, in which the overlapping intensity profile discs 106 have coordinates in a coordinate space composed of a first axis (e.g., the x-axis or the y-axis) and a second axis (e.g., the other one of the x-axis and the y-axis). The overlapping intensity profile discs 106 may also be displayed as one or more edges of solid shapes on the display device 102.

The display system 100 is also depicted as including a computing apparatus 110, which may control the display of images 104 on the display device 102. The computing apparatus 110 may be a personal computer, a laptop computer, a server computer, a smartphone, a tablet computer, a set of components (e.g., circuits) to perform computing operations, etc. In an example, the computing apparatus 110 may include computing components integrated into an instrument panel of an aircraft. Additionally, the display device 102 may be separate from or may be integrated with the computing apparatus 110.

According to an example, the computing apparatus 110 is to cause overlapping intensity profile discs 106 to be displayed in place of a line because the overlapping intensity profile discs 106 may result in a relatively smoother appearance than the line, for instance, when the overlapping intensity profile discs 106 extend along angles other than 0°, 90°, 180°, and 270°. In addition, the computing apparatus 110 may cause the overlapping intensity profile discs 106 to be displayed such that polygons created at the intersections of the displayed overlapping intensity profile discs 106 are relatively smooth. In other words, the computing apparatus 110 may cause the image 104 to be displayed with anti-aliased lines. Additionally, to ensure that the overlapping intensity profile discs 106 are clearly visible on the display device 102 when the background color on which the overlapping intensity profile discs 106 are to be displayed is not black and the color of the line to be displayed is not white, a second set of overlapping intensity profile discs (not shown) that may primarily have a black color may be displayed prior to the overlapping intensity profile discs 106 being displayed. In this example, the overlapping intensity profile discs 106 may be displayed over the second set of overlapping intensity profile discs as also discussed in greater detail herein.

The computing apparatus 110 is depicted as including a processor 112, a data store 114, a display buffer 116, and a computer readable medium 120. The computing apparatus 110 may also include additional hardware and/or software that may perform various functions in causing images 104 to be displayed on the display device 102. The processor 112 may be any of a central processing unit (CPU), a graphics processing unit (GPU), a semiconductor-based microprocessor, an application specific integrated circuit (ASIC), and/or other hardware device suitable for retrieval and execution of instructions stored on the computer readable medium 120. The processor 112 may fetch, decode, and execute instructions, such as instructions 122-130 stored on the computer readable medium 120. The instructions may include instructions 122 to determine coordinates of a line to be displayed on the display device 102, instructions 124 to identify (e.g., generate and/or select) a first set of intensity profile discs, instructions 126 to identify (e.g., generate and/or select) a second set of intensity profile discs, instructions 128 to cause the second set of intensity profile discs to be displayed, and instructions 130 to cause the first set of intensity profile discs to be displayed over the second set of intensity profile discs. As an alternative or in addition to retrieving and executing instructions, the processor 112 may include one or more electronic circuits that include electronic components for performing the functionalities of the instructions 122-130.

The computer readable medium 120 may be any electronic, magnetic, optical, or other physical storage device that contains or stores executable instructions. Thus, the computer readable medium 120 may be, for example, Random Access Memory (RAM), an Electrically Erasable Programmable Read-Only Memory (EEPROM), a storage device, an optical disc, and the like. In some implementations, the computer readable medium 120 may be a non-transitory machine-readable storage medium, where the term "non-transitory" does not encompass transitory propagating signals.

The data store 114 may store information such as information pertaining to the image 104 to be displayed. The data store 114 may be volatile and/or non-volatile memory, such as DRAM, EEPROM, MRAM, phase change RAM (PCRAM), memristor, flash memory, and the like. The processor 112 may access the information stored in the data store 114 to cause the image 104 to be displayed as overlapping intensity profile discs 106 on the display device 102. Additionally, the processor 112 may store sets of intensity profile discs corresponding to the lines in the display buffer 116 and the contents of the display buffer 116 may periodically be outputted to the display device 102 to cause the display device 102 to display the sets of overlapping intensity profile discs 106. The processor 112 may also store data pertaining to the display of the overlapping intensity profile discs 106 in pixels without the use of intensity profile discs, for instance, when the lines are to be displayed as straight lines that extend at one of the angles 0°, 90°, 180°, and 270° as these lines may already appear to be smooth lines. In other examples, however, the processor 112 may also select sets of intensity profile discs for lines that extend at those angles and may store those selected sets of intensity profile discs in the display buffer 116.

Although not shown, the computing apparatus 110 may further include an input/output interface through which the processor 112 may communicate with an external device(s) (not shown), for instance, to receive and store the information pertaining to the image 104 to be displayed. The input/output interface may include hardware and/or software to enable the processor 112 to communicate with the external device(s). The input/output interface may enable a wired or wireless connection to the output device(s). The input/output interface may further include a network interface card and/or may also include hardware and/or software to enable the processor 112 to communicate with various input and/or output devices, such as a keyboard, a mouse, a display, another computing device, etc., through which a user may input instructions into the computing apparatus 110.

Figure 2:
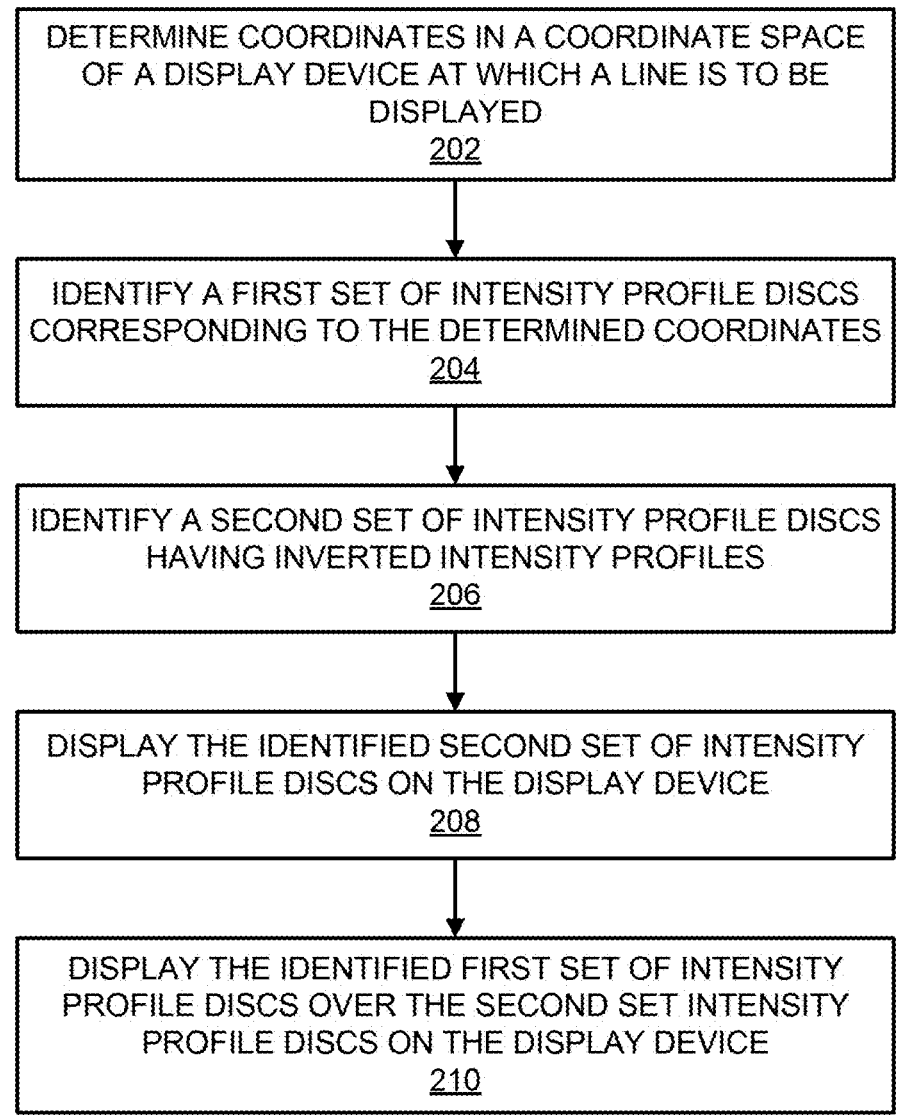
FIG. 2 shows a flow diagram of a method for displaying intensity profile discs on a display device.

With reference now to FIG. 2, there is shown a flow diagram of a method 200 for displaying intensity profile discs 106 on a display device 102, according to an example. It should be understood that the methods disclosed herein may include additional operations and that some of the operations described therein may be removed and/or modified without departing from the scopes of the methods. Generally speaking, the processor 112 of the computing apparatus 110 may implement or execute the instructions 122-130 stored on the computer readable medium 120 to perform the methods disclosed herein.

At block 202, the processor 112 may determine coordinates in a coordinate space of a display device 102 at which a line is to be displayed. For instance, the processor 112 may access information pertaining to a line to be displayed on the display device 102 from the data store 114. The processor 112 may also execute the instructions 122 to determine coordinates in the coordinate space of the display device 102 at which the line is to begin and end. Thus, for instance, the processor 112 may determine the x and y coordinates of the display device 102 at which each position of the line is to be displayed.

At block 204, the processor 112 may identify a first set of intensity profile discs corresponding to the determined coordinates at which the line is to be displayed. The processor 112 may execute the instructions 124 to identify a set of intensity profile discs from a group of intensity profile discs, in which each of the intensity profile discs in the group of intensity profile discs has a different centralized maximum intensity position in a grid. That is, the grid may be composed of an N×N set of pixels, in which the variable "N" is an integer value greater than one, and the intensity profile discs may occupy an M×M subset of the pixels or a subset of sub-pixels of the pixels, in which the variable "M" is an integer value greater than one. Each of the intensity profile discs may fall on different subsets of the sub-pixels such that centers of the intensity profile discs fall on or between different ones of the sub-pixels forming the pixel. In addition, each of the intensity profile discs may have an intensity profile that includes the intensity level at a central area being larger than the intensity level at an outer area of the intensity profile disc. The group of intensity profile discs may include intensity profile discs that are respectively centered at each of a number of possible locations of a pixel or group of sub-pixels as discussed in greater detail herein. In addition, a manner in which certain ones of the intensity profile discs may be selected from the group of intensity profile discs is described in detail herein.

Figure 3A:
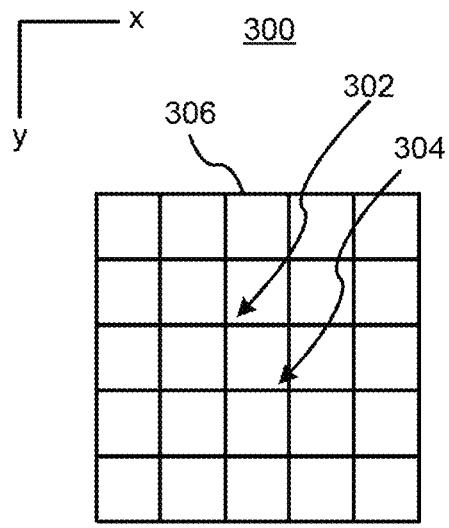
FIGS. 3A, 3B, 3C and 3D, respectively, show grids and respective intensity profile discs.

According to an example, the processor 112 may execute the instructions 124 to generate the first set of intensity profile discs and/or the group of intensity profile discs. In other examples, the processor 112 or another processor may generate the group of intensity profile discs prior to implementation of the method 200. In any regard, an example of a manner in which the intensity profile discs may be generated is described with respect to FIGS. 3A-3D. In FIG. 3A, there is shown an example of a grid 300, upon which the group of intensity profile discs may be generated. The grid 300 is depicted as being composed of a 5×5 array of pixels 306 and each of the intensity profile discs may be formed of a 4×4 array of pixels 306. The grid 300 is thus depicted as including 25 pixels 306. According to an example, varying the intensities of the pixels within the 5×5 grid, 64 subpixel positions may be represented. In this example, a first location 302 of the grid 300, which may be referenced as having the coordinates (0, 0), may denote the central location of a first intensity profile disc and a second location 304 of the grid 300, which may be referenced as having the coordinates (7/8, 7/8), may denote the central location of a final intensity profile disc in a group of intensity profile discs. The pixels 306 may each include an 8×8 array of sub-pixels and the intensity profile discs in this example may be provided at $\frac{1}{8}^{th}$ of a pixel resolution.

Figure 3B:
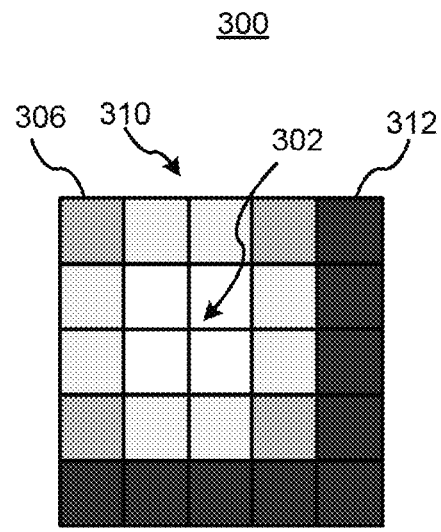

In FIG. 3B, there is shown an example of the grid 300 in which a first intensity profile disc 310 has been generated. As shown, the first intensity profile disc 310 has a higher intensity in the array of 2×2 pixels forming the central section of the first intensity profile disc 310 and a lower intensity around the outer pixels. According to an example, a weighting for a desired intensity distribution between the central section and the section around the central section may be identified and may be used to generate a master intensity profile disc. Thus, for instance, depending upon the desired intensity distribution, the weighting may vary and thus, the intensity distribution between the central section and the section around the central section may vary. The identified weighting may also be applied to the RGB color values to determine the RGB value of each of the pixels 306. The weighting may be user-specified or may be based upon, for instance, various features of the display device 102, the type of information to be displayed, etc.

The first intensity profile disc 310 is depicted as being centered around the first location 302 of the grid 300. The pixels 312 of the grid 300 surrounding the first intensity profile disc 310 have been depicted as having a dark color, e.g., a black color, because those pixels 312 may not form part of the first intensity profile disc 310 and may not be displayed when the first intensity profile disc 310 is displayed.

Figure 3C:
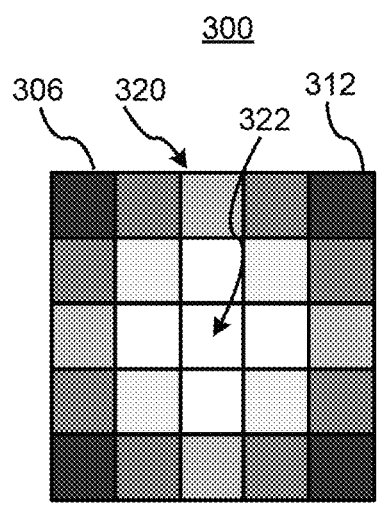
Figure 3D:
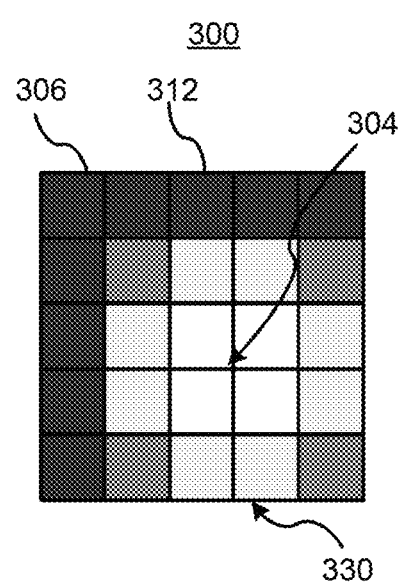

In FIG. 3C, there is shown an example of the grid 300 in which a second intensity profile disc 320 has been generated. The second intensity profile disc 320 is depicted as being centered around a central location 322, which may be referenced as having the coordinates (4/8, 4/8). FIG. 3D shows an example of the grid 300 in which a third intensity profile disc 330 has been generated. The third intensity profile disc 330 is depicted as being centered around the second location 304, e.g., coordinates (7/8, 7/8), of the grid 300. Although not shown in the figures, additional intensity profile discs centered around remaining coordinates, e.g., (0, 1/8), (0, 2/8), (0, 3/8) . . . (7/8, 0), (7/8, 1/8), (7/8, 2/8) . . . (7/8, 6/8), may also be generated and included in the group of intensity profile discs. Thus, for instance, in the examples shown in FIGS. 3A-3D, the group of intensity profiles may include 64 distinct intensity profile discs, each centered around different locations of the grid 300.

Figure 4:
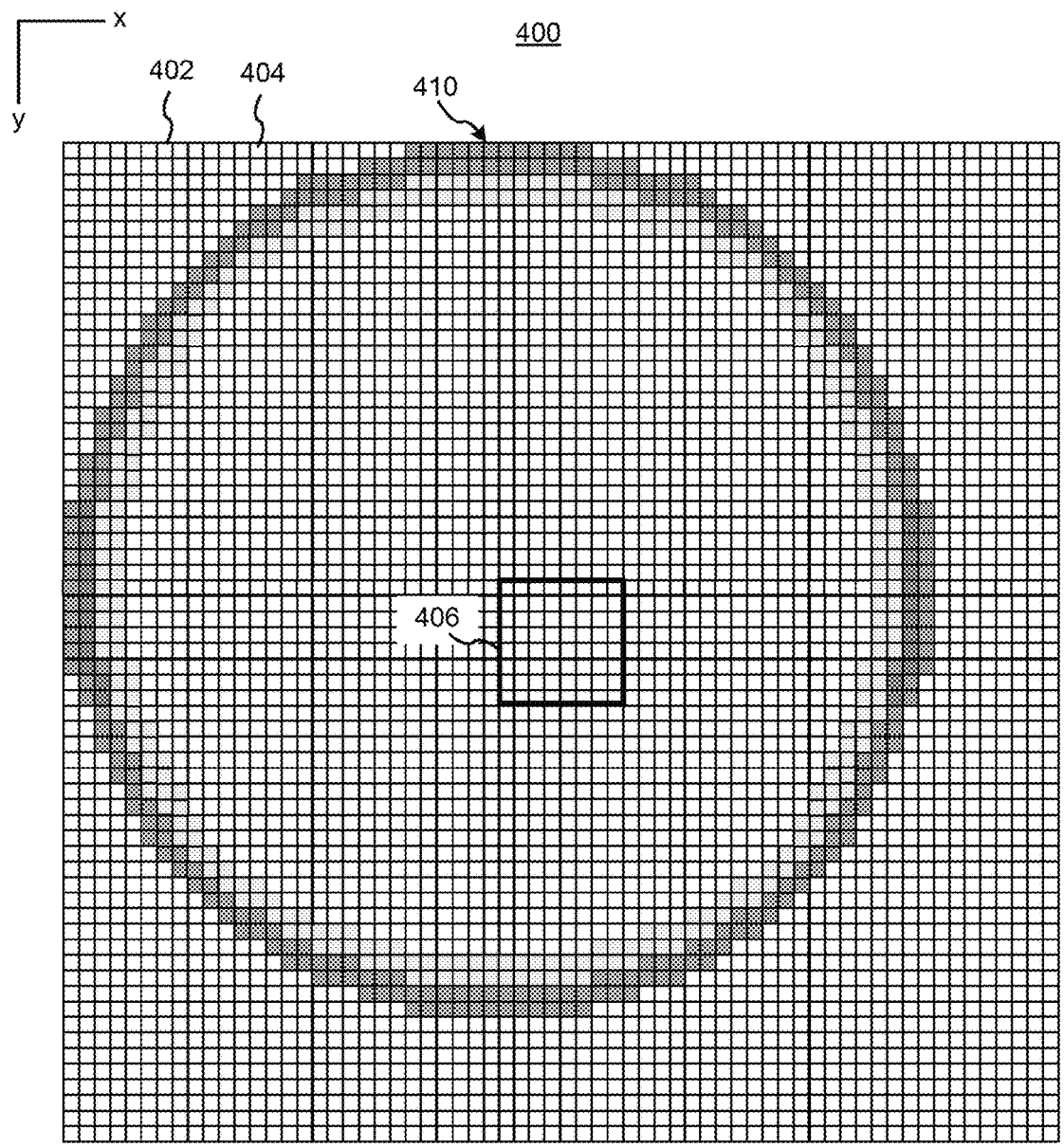
FIG. 4 shows a grid and an intensity profile disc.

Although not shown in FIGS. 3A-3D, the intensity profile discs may be generated over pixels that are composed of sub-pixels. Thus, for instance, each of the pixels 306 may be composed of sub-pixels, e.g., an 8×8 array of sub-pixels. Another example is shown in FIG. 4, which depicts a grid 400 composed of a plurality of pixels 402 (only one pixel 402 is shown with a darker outline, but it should be understood that the grid 400 is composed of an 8×8 array of pixels 402), in which each of the pixels 402 is composed of a plurality of sub-pixels 404. Particularly, the grid 400 is depicted as including an 8×8 array of pixels 402, each including an 8×8 array of sub-pixels 404. In this regard, the grid 400 includes an array of 64×64 sub-pixels 404. Also shown in FIG. 4 is an example 6×6 pixel intensity profile disc 410 that is centered at a leftmost and topmost position on the grid 400. The intensity profile disc 410 may be considered as being centered at a first location (0, 0) on the grid 400. As shown, the sub-pixels 404 contained in the central area of the intensity profile disc 410 may have a higher intensity level than the outer areas of the intensity profile disc 410. In addition, as the intensity profile disc 410 may be generated at a relatively higher resolution as compared with the intensity profile disc 310 shown in FIG. 3B, the intensity profile disc 410 may have a substantially circular shape.

According to an example, the intensity profile disc 410 may be a master profile disc that may be used to generate additional intensity profile discs that are centered at different locations on the grid 400. The intensity profile disc 410 may be generated through the following sequence. 1) The master profile disc may be set for location (0, 0). For instance, the intensity of each sub-pixel in the master profile disc 410 may be set up to create a high intensity center and a gradual lower intensity towards the outer edge of the master profile disc 410. This arrangement may be similar to a Gaussian profile. By way of example, each of the sub-pixels in the master profile disc 410 may contain a value between 1 and 0 and moving from the outer edge of the master profile disc 410 towards the center, the sub-pixel intensity values may increase from 0 to 0.25 to 0.5 to 1. 2) The sub-pixel 404 intensities within a pixel 402 for the master profile disc 410 may be summed and normalized to obtain an overall intensity for that pixel 402. 3) Step 2) may be repeated for each of the pixels 402 contained in the master profile disc. 4) The summed and normalized intensities of the pixels 402 may be used to form the intensity profile disc 410. The above-described sequence may be repeated with the master profile disc set for a set of additional locations in the grid. The set of additional locations in the grid 400 may include a next position (0, 1/8) to form a second intensity profile disc centered at that next position (0, 1/8). Additionally, the above-described sequence may be repeated for the remaining positions (0, 2/8), (0, 3/8), . . . (7/8, 7/8) to form a group of 64 intensity profile discs.

In the example shown in FIG. 4, a group of intensity profile discs may be generated at $\frac{1}{8}^{th}$ pixel resolution (or, 1 sub-pixel resolution). That is, each of the 64 intensity profile discs in the group of intensity profile discs may be centered at a different position with respect to a central 8×8 array of sub-pixels 406. In other examples, however, the group of intensity profile discs may include other numbers of intensity profile discs, for instance, a smaller number of intensity profile discs.

As shown, the central 8×8 array of sub-pixels 406 on which each group of intensity profile discs may be respectively centered is shown in dark outline and the intensity profile disc 410 shown in FIG. 4 is centered at a top left corner of that outlined square. The top left corner of the central sub-pixels 406 may be construed as having the coordinates (0, 0), the bottom left corner may be construed as having the coordinates (0, 1), and the top right corner may be construed as having the coordinates (1, 0). Thus, for instance, the intensity profile disc 410 shown in FIG. 4 may be assigned the coordinates (0, 0) while an intensity profile disc that is centered with respect to the central sub-pixels 406 may be assigned the coordinates (4/8, 4/8). As discussed in detail herein, the coordinates assigned to the intensity profile discs may be used in determining which of the intensity profile discs are to be selected for positions in the line based upon the sub-pixel fractional components of the positions with respect to the pixels on which the positions are to be displayed.

The group of intensity profile discs may include intensity profile discs having different sizes as compared to the one shown in FIG. 4. For instance, the intensity profile discs may be formed of an array of 3×3 pixels and the grid on which the intensity profile discs are formed may have a 32×32 array of sub-pixels. In another example, the intensity profile discs may be formed of an array of 4×4 pixels and the grid on which the intensity profile discs are formed may have a 40×40 array of sub-pixels.

According to an example, a group of intensity profile discs for each of a plurality of differently sized intensity profile discs may be generated and stored in the data store 114. By way of example, the group of intensity profile discs may be stored as gray scale intensities and color may be applied to the intensity profile discs as the intensity profile discs are being displayed. In this example, the processor 112 may select one of the groups of intensity profile discs depending upon the thickness of the line that is to be displayed. For instance, at block 204, the processor 112 may identify the group of intensity profile discs having intensity profile discs that most closely match in size to the line and may select the first set of intensity profile discs from the selected group of intensity profile discs. In addition, color that matches the color of the line that the selected group of intensity profile discs may be applied to the selected group of intensity profile discs as the intensity profile discs are being displayed. That is, color corresponding to the gray scales in the intensity profile discs may be applied as the intensity profile discs are being displayed.

In another example, groups of intensity profile discs having different colors (RGB values) may be generated and stored in the data store 114. In this example, a number of groups of intensity profile discs having different sizes may be generated for a first color, a number of groups of intensity profile discs having different sizes may be generated for a second color, and so forth. In this example, the processor 112 may select one of the groups of intensity profile discs depending upon the thickness and the color of the line that is to be displayed. For instance, at block 204, the processor 112 may identify the group of intensity profile discs having intensity profile discs that most closely match in size and color to the line and may select the first set of intensity profile discs from the selected group of intensity profile discs.

Figure 5:
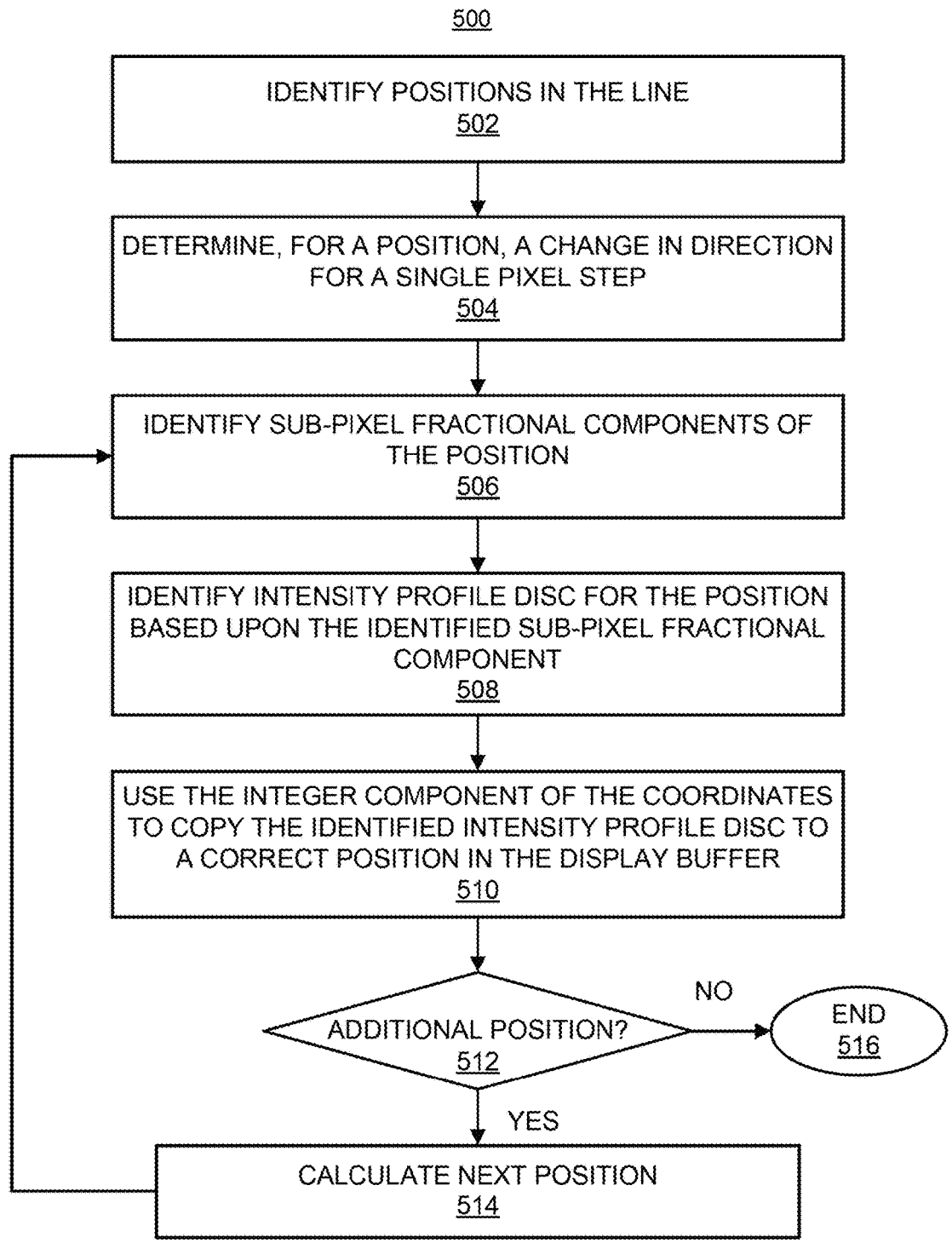
FIG. 5 shows a flow diagram of a method for identifying, from a group of intensity profile discs, the first set of intensity profile discs that correspond to the determined coordinates at which a line is to be displayed in the method of FIG. 2.

With reference now to FIG. 5, there is shown a flow diagram of a method 500 for identifying, from a group of intensity profile discs, the first set of intensity profile discs that correspond to the determined coordinates at which the line is to be displayed at block 204 in FIG. 2, according to an example. At block 502, positions along the line may be identified. That is, for instance, the processor 112 may determine the starting coordinates $(X_1, Y_1)$ and the ending coordinates $(X_D, Y_D)$ of the line and the coordinates $(X_C, Y_C)$ of the positions between the starting and the ending coordinates. In addition, the processor 112 may determine a separate position for each of the pixels at which the line is to be displayed.

Figure 6:
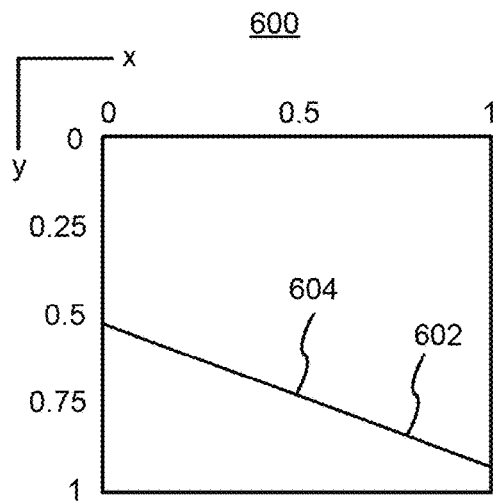
FIG. 6 shows a diagram of a pixel and a position of a line in the pixel.

At block 504, a change in direction along the coordinates for a position from a previous position in the line and for a single pixel step may be determined. For instance, the processor 112 may determine, for a single pixel step in one direction, the change in the other direction. The processor 112 may determine that from one pixel to the next, the direction of the line position changes. By way of example, the processor 112 may determine the next pixel in the X direction and the change in the other direction (DY/DX). The processor 112 may step in the vertical direction if the line is more vertical than horizontal or the processor 112 may step in the horizontal direction if the line is more horizontal than vertical. In addition, at block 506, the sub-pixel fractional components of the line position may be identified. In other words, and with respect to the diagram of a pixel 600 shown in FIG. 6, the processor 112 may determine the X and Y components of the line position 602 in the pixel 600. That is, the pixel 600 may be considered as having a coordinate system composed of origin coordinates (0, 0) and end coordinates (1, 0) and (0, 1) and the line position 602 may be centered at a particular set of coordinates in the coordinate system. As shown, the line position 602 may be centered 604 at the coordinate locations (0.5, 0.75). In this example, the sub-pixel fractional components of the line position 602 may thus be identified as (0.5, 0.75).

At block 508, an intensity profile disc may be identified for the line position based upon the sub-pixel fractional components identified at block 506. That is, the processor 112 may identify the intensity profile disc that is centered around (or is most nearly centered around) the same coordinates as the sub-pixel fractional components identified for that line position. In the example above, the processor 112 may identify the intensity profile disc that is centered around the coordinates (0.5, 0.75). As discussed above with respect to FIG. 4, the intensity profile discs may be centered around different locations between a first location (0, 0) and a second location (7/8, 7/8) of a central array of sub-pixels.

At block 510, the integer component of the coordinates at which a change in direction was determined at block 504 may be used to copy the identified intensity profile disc to a correct position in the display buffer 116. The integer component of the coordinates may be the coordinate in which the single pixel step was taken at block 504. That is, the integer component may be the coordinate without the fractional components. For instance, if the coordinate is (25.25, 150.75), the integer component is (25, 150) and the intensity profile disc centered at coordinates (2/8, 6/8) may be selected to be displayed at that coordinate.

At block 512, the processor 112 may determine whether the line includes an additional position to be processed. In response to a determination that the line includes an additional position to be processed, the processor 112 may calculate the next position as indicated at block 514. The next position may be calculated as:

$X_{C+1} = X_C + X\_STEP$; and $Y_{C+1} = Y_C + Y\_STEP$.

In other words, the processor 112 may determine the line position immediately adjacent to the previously processed line position. In addition, the processor 112 may repeat blocks 506-512 on the next line position and may repeat blocks 506-514 until a determination that no additional line positions remain to be processed at block 512. Following the "no" condition at block 512, the method 500 may end, resulting in a set of intensity profile discs being identified for the line positions of the line, as indicated at block 516. That is, the set of intensity profile discs may include an intensity profile disc to be displayed for each line position and the location on the display device 102 at which the intensity profile disc is to be displayed in place of each line position.

Figure 7:
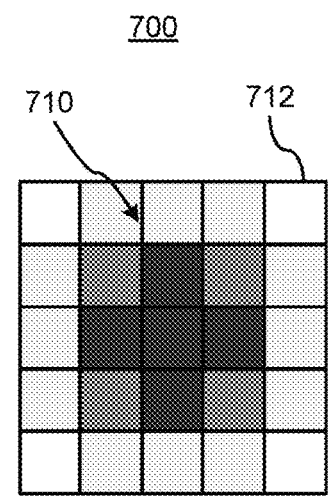
FIG. 7 depicts an inverted intensity profile disc corresponding to the intensity profile disc shown in FIG. 3C.

With reference back to FIG. 2, at block 206, a second set of intensity profile discs having inverted intensity profiles from the identified first set of intensity profile discs may be selected. For instance, the processor 112 may execute the instructions 126 to identify (e.g., select and/or generate) the second set of intensity profile discs from the first set of intensity profile discs identified at block 204. That is, the processor 112 may select, for each of the intensity profile discs in the first set of intensity profile discs, a corresponding intensity profile disc, in which the corresponding intensity profile disc has an inverted intensity profile with respect to the intensity profile disc. By way of example and with reference to the intensity profile disc 320 depicted in FIG. 3C, the intensity profile disc in the second set corresponding to the intensity profile disc 320 may have an inverted intensity profile. In this example, the corresponding intensity profile disc may have a central area that is darker in color than the outer area of the corresponding intensity profile disc. In FIG. 7, there is shown an example of an intensity profile disc 710 displayed on a grid 700 that corresponds to and is inverted from the intensity profile disc 320 shown in FIG. 3C. The pixels 712 of the grid 700 surrounding the corresponding intensity profile disc 710 have been depicted as having a light color, e.g., a white color, because those pixels 712 may not form part of the corresponding inverted intensity profile disc 710 and may not be displayed when the intensity profile disc 710 is displayed.

At block 206, the processor 112 may select the intensity profile discs for the second set if the intensity profile discs for the second set of intensity profile discs are available, e.g., has previously been generated. However, the processor 112 may generate the intensity profile discs for the second set at block 206 if the intensity profile discs for the second set of intensity profile discs are not available.

At block 208, the second set of intensity profile discs identified at block 206 may be displayed on the display device 102. That is, the processor 112 may execute the instructions 128 to cause the identified second set of intensity profile discs to be displayed at the coordinates identified for the intensity profile discs in the first set to which the intensity profile discs in the second set respectively correspond. For instance, the processor 112 may associate the identified coordinates of each of the intensity profile discs in the first set with the respective corresponding intensity profile discs in the second set. In addition, the processor 112 may copy the corresponding intensity profile discs in the second set to the identified coordinates in the display buffer 116 and the display buffer 116 may output the corresponding intensity profile discs at the identified coordinates on the display device 102.

Figure 8A:
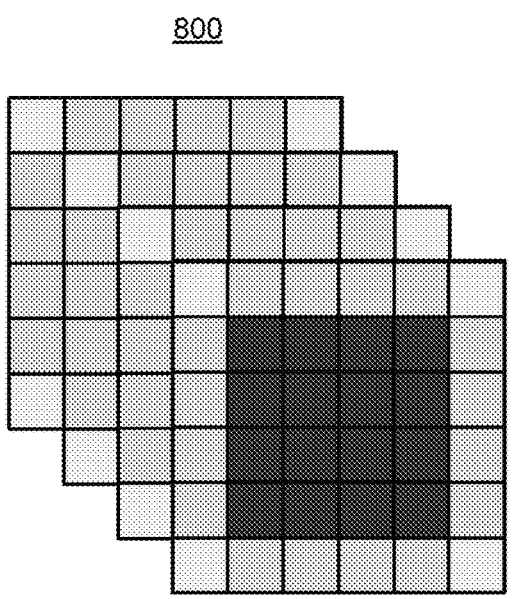
FIGS. 8A and 8B, respectively, depict partially overlapping inverted intensity profile discs.
Figure 8B:
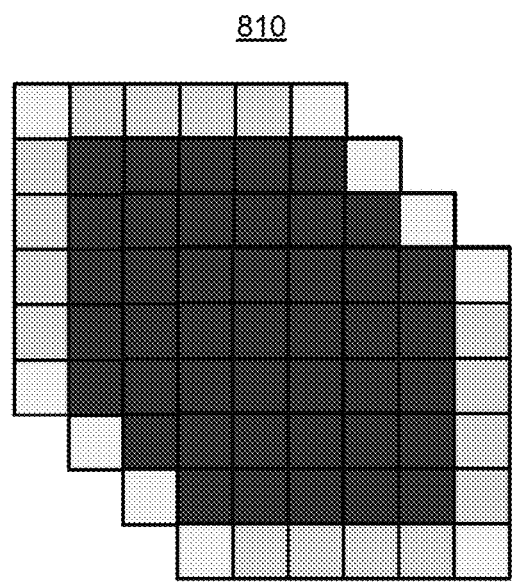

In displaying the intensity profile discs of the second set, the intensity profile discs may be displayed such that they partially overlap each other. Examples of partially overlapping corresponding intensity profile discs are shown in the diagrams 800 and 810 respectively depicted in FIGS. 8A and 8B. As shown in the diagram 800, the intensity profile discs may be displayed in sequence and thus, the later shown intensity profile discs may block portions of the previously displayed intensity profile discs. As a result, major portions of previously displayed intensity profile discs may not be visible and thus, a desired display of an image 104 may not be achieved. In order to overcome this potential issue, a MIN operator may be used such that, for each of the pixels (or sub-pixels), the lowest intensity value to be displayed for that pixel (or sub-pixel) is displayed. An example of a display in which the MIN operator is applied to overlapping intensity profile discs is the second set is shown in the diagram 810 in FIG. 8B. As shown, the darker areas of each of the overlapping intensity profile discs may be displayed as those areas have the lowest intensity values.

At block 210, the first set of intensity profile discs identified at block 204 may be displayed over the displayed second set of intensity profile discs on the display device 102. That is, the processor 112 may execute the instructions 130 to cause the selected first set of intensity profile discs to be displayed at the identified coordinates for the intensity profile discs in the first set, which may result in the intensity profile discs in the first set being displayed on top of the currently displayed second set of intensity profile discs. For instance, the processor 112 may have copied the intensity profile discs in the first set to the identified coordinates in the display buffer 116 and the display buffer 116 may output the intensity profile discs at the identified coordinates on the display device 102.

Figure 9A:
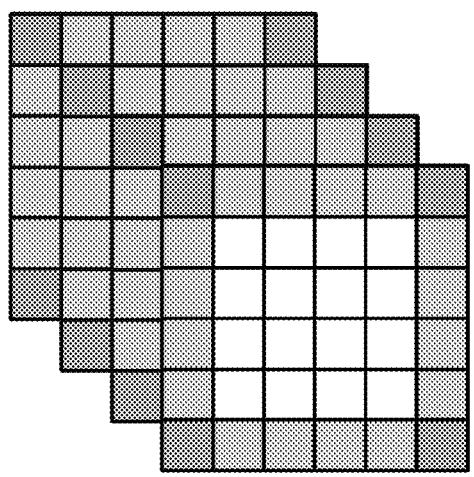
FIGS. 9A and 9B, respectively, depict partially overlapping intensity profile discs.
Figure 9B:
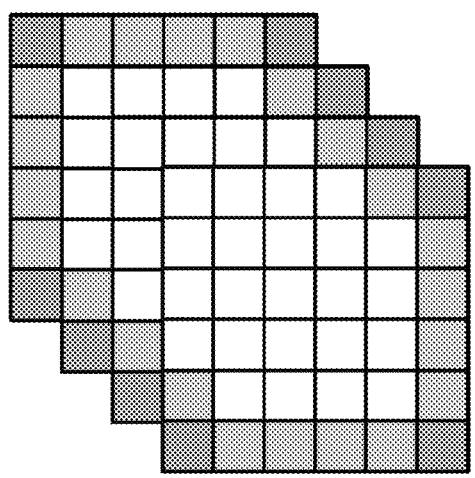

In displaying the corresponding intensity profile discs of the first set, the intensity profile discs may be displayed such that they partially overlap each other. Examples of partially overlapping intensity profile discs of the first set are shown in the diagrams 900 and 910 respectively depicted in FIGS. 9A and 9B. As shown in the diagram 900, the intensity profile discs may be displayed in sequence resulting in the later shown intensity profile discs blocking portions of the previously displayed intensity profile discs. As a result, major portions of the previously displayed intensity profile discs may not be visible and thus, a desired display of an image 104 may not be achieved. In order to overcome this potential issue, a MAX operator may be used such that, for each of the pixels (or sub-pixels), the highest intensity value to be displayed for that pixel (or sub-pixel) is displayed. An example of a display in which the MAX operator is applied to overlapping intensity profile discs is shown in the diagram 910 in FIG. 9B. As shown, the lighter areas of each of the overlapping intensity profile discs may be displayed as those areas have the highest intensity values.

Figure 10:
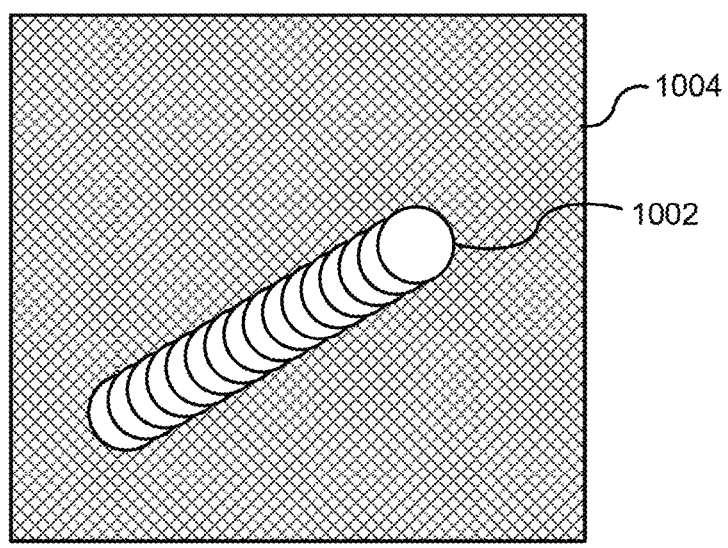
FIG. 10 depicts an enlarged diagram of a set of intensity profile discs displayed on a section of a display device.

Through implementation of the method 200, a set of intensity profile discs may be displayed in place of a line, in which the display of the set of intensity profile discs may result in a relatively smoother appearance than the line. This may be more prevalent in instances in which the line is at an angle other than horizontal or vertical. In FIG. 10, there is shown an enlarged diagram 1000 of a set of intensity profile discs 1002 being displayed on a section 1004 of a display device 102. According to an example, the section 1004 on which the set of intensity profile discs 1002 are displayed may have a color other than black and the set of intensity profile discs 1002 may primarily have a color other than white. In this example, through selection and display of the second set of intensity profile discs, which may primarily have a dark or black color, the set of intensity profile discs 1002 may be displayed on a dark or black background. This may result in the set of intensity profile discs 1002 being displayed with a color that accurately matches the color of the line that the intensity profile discs 1002 have replaced.

According to an example, the processor 112 may determine whether to implement the method 200 on a line to be displayed based upon whether the line is to extend vertically, horizontally, or at another angle. In this example, the processor 112 may determine that the line is to be displayed instead of the intensity profile discs in instances in which the line is to extend vertically or horizontally because displaying lines in this manner may not result in aliasing or in significant aliasing. In addition, the processor 112 may determine that intensity profile discs are to be displayed in place of the line in instances in which the line is to extend at an angle other than horizontal or vertical and may thus implement the method 200 for that line.

Figure 11:
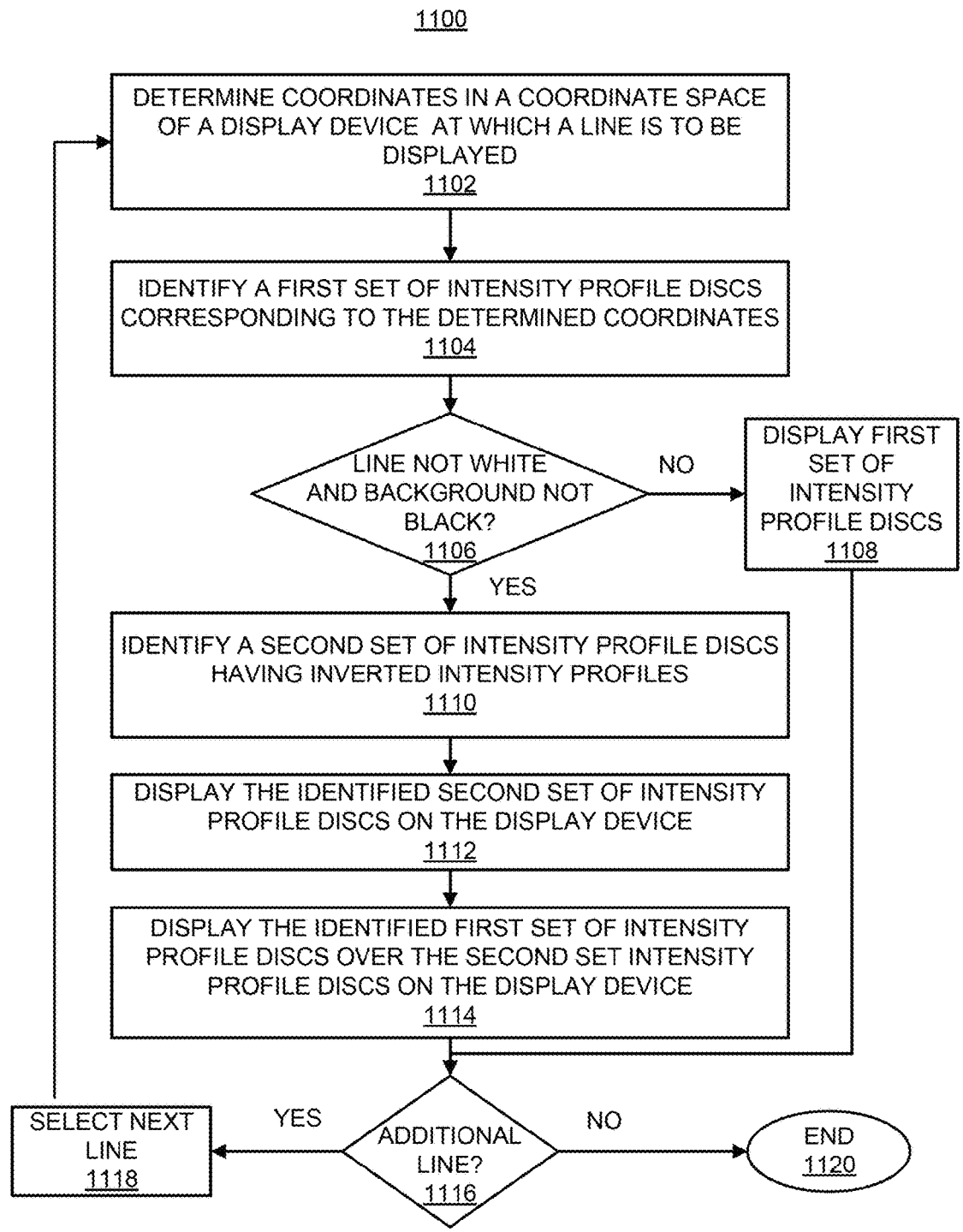
FIG. 11 shows a flow diagram of a method for displaying images on a display device.

Turning now to FIG. 11, there is shown a flow diagram of a method 1100 for displaying images on a display device, according to another example. At block 1102, the processor 112 may determine coordinates in a coordinate space of a display device 102 at which a line is to be displayed. The processor 112 may determine the coordinates as discussed above with respect to block 202 in FIG. 2. In addition, at block 1104, the processor 112 may identify a first set of intensity profile discs corresponding to the determined coordinates at which the line is to be displayed in any of the manners discussed above with respect to block 204 in FIG. 2.

At block 1106, the processor 112 may determine whether the line has a color other than white and is to be displayed directly on a background section that has a color other than black. In other words, the processor 112 may determine whether the line is not white and the background section is not black. The background section may include the pixels of the display device 102 on which the line is to be displayed. In response to a determination that the line has a white color and/or the background section is black color, which corresponds to the "no" condition from block 1106, the first set of intensity profile discs identified at block 1104 may be displayed as indicated at block 1108. Thus, for instance, the "no" condition may be met if the line has a blue color and the background is black. As another example, the "no" condition may be met if the line has a white color and the background is blue. The first set of intensity profile discs may be displayed in any of the manners discussed above.

However, in response to a determination that the line does not have a white color and the background section is not black at block 1106, which corresponds to the "yes" condition, the processor 112 may identify (e.g., generate/select) a second set of intensity profile discs having inverted intensity profiles from the intensity profile discs of the first set of intensity profile discs, as indicated at block 1110. The processor 112 may identify the second set of intensity profile discs in any of the manners discussed above with respect to block 206 in FIG. 2.

At block 1112, the processor 112 may cause the identified second set of intensity profile discs to be displayed on the display device 102 in any of the manners discussed above with respect to block 208 in FIG. 2. In addition, at block 1114, the processor 112 may cause the first set of intensity profile discs to be displayed over the displayed second set of intensity profile discs on the display device 102 as discussed above with respect to block 210 in FIG. 2.

Following either of blocks 1108 and 1114, the processor 112 may determine whether an additional line is to be displayed, as indicated at block 1116. In response to a determination that an additional line is to be displayed, the processor may select the next line to be displayed as indicated at block 1118. In addition, blocks 1102-1114 may be repeated for the selected next line and blocks 1102-1116 may be repeated for any additional lines until a determination is made that no additional lines are to be displayed. That is, following the "no" condition at block 1116, the method 1100 may end as indicated at block 1120.

According to an example, the processor 112 may determine whether to implement the method 1100 on a line to be displayed based upon whether the line is to extend vertically, horizontally, or at another angle. In this example, the processor 112 may determine that the line is to be displayed instead of intensity profile discs in instances in which the line is to extend vertically or horizontally. In addition, the processor 112 may determine that intensity profile discs are to be displayed in place of the line in instances in which the line is to extend at an angle other than horizontal or vertical and may thus implement the method 1100 for that line.

Some or all of the operations set forth in the methods 200, 500, and 1100 may be contained as utilities, programs, or subprograms, in any desired computer accessible medium. In addition, the methods 200, 500, and 1100 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What we claim is:

1. A computer-implemented method for displaying intensity profile discs, said method comprising:
   determining, by a processor, coordinates in a coordinate space of a display device at which a line is to be displayed;
   identifying, by the processor, a first set of intensity profile discs corresponding to the determined coordinates;
   identifying, by the processor, a second set of intensity profile discs having inverted intensity profiles from the identified first set of intensity profile discs;
   displaying, by the processor, the selected second set of intensity profile discs at the determined coordinates on the display device; and
   displaying, by the processor, the identified first set of intensity profile discs over the displayed second set of intensity profile discs on the display device.

2. The method according to claim 1, wherein displaying the identified first set of intensity profile discs further comprises displaying the identified first set of intensity profile discs to match a color of the line to be displayed and wherein central areas of the selected second set of intensity profile discs are black.

3. The method according to claim 1, wherein identifying the second set of intensity profile discs and displaying the identified second set of intensity profile discs further comprise identifying the second set of intensity profile discs and displaying the identified second set of intensity profile discs in response to the line having a color other than white and a background section on which the line is to be directly displayed having a color other than black.

4. The method according to claim 1, further comprising:
   identifying positions along the line; and
   identifying sub-pixel fractional components of each of the identified positions,
   wherein identifying the first set of intensity profile discs further comprises, for each of the identified positions, identifying, from a group of intensity profile discs, a respective intensity profile disc that corresponds to the identified sub-pixel fractional components, wherein each intensity profile disc of the group includes a different intensity profile across an N×N set of pixels and is centered around respective sub-pixel fractional components of the N×N set of pixels, wherein "N" is an integer value greater than one.

5. The method according to claim 1, further comprising:
   generating, for each of the identified intensity profile discs in the first set, a corresponding intensity profile disc having an inverted intensity profile as compared with a respective intensity profile disc in the first set; and
   wherein identifying the second set of intensity profile discs further comprises identifying the generated corresponding intensity profile discs.

6. The method according to claim 1, further comprising:
   copying the identified second set of intensity profile discs and the identified first set of intensity profile discs to a display buffer, wherein the display buffer is to output the identified second set of intensity profile discs and the identified first set of intensity profile discs at integer components of the determined coordinates to be displayed on the display device.

7. The method according to claim 1, wherein identifying the first set of intensity profile discs and identifying the second set of intensity profile discs further comprise:
identifying coordinates of a starting position of the line;
identifying sub-pixel fractional components of the identified starting position coordinates; identifying an intensity profile disc from a group of intensity profile discs for the starting position corresponding to the identified sub-pixel fractional components of the identified starting position coordinates;
identifying an inverted intensity profile disc corresponding to the identified intensity profile disc;
identifying coordinates of a next position of the line;
identifying sub-pixel fractional components of the identified coordinates of the next position;
identifying a next intensity profile disc from the group of intensity profile discs for the identified coordinates of the next position; and
identifying a next inverted intensity profile disc corresponding to the identified next intensity profile disc.

8. The method according to claim 1, further comprising:
generating a group of intensity profile discs, wherein the first set of intensity profile discs is identified from the generated group, and wherein each of the intensity profile discs in the group includes an intensity profile disc centered around a different location in an N×N set of pixels, wherein "N" is an integer value greater than one, wherein generating the group of intensity profile discs further comprises generating the group of intensity profile discs such that centers of the intensity profile discs in the group are offset from each other by at least a ⅛th pixel resolution in either or both of two orthogonal axes of the coordinate space.

9. The method according to claim 1, further comprising:
generating a master profile disc by:
a) setting a first location in a grid;
b) summing and normalizing sub-pixel intensities within a pixel for the master disc profile;
c) repeating step b) for each of the pixels contained in the master profile disc;
d) using the summed and normalized intensities to form the master profile disc; and
generating the first set of intensity profile discs by repeating steps a)-d) for additional intensity profile discs that are each centered around a respective location of a set of additional locations in the grid.

10. A computing system comprising:
a processor; and
a non-transitory computer readable medium on which is stored computer readable instructions that when executed cause the processor to:
determine coordinates in a coordinate space of a display device at which a line is to be displayed;
identify a first set of intensity profile discs corresponding to the determined coordinates;
identify a second set of intensity profile discs, wherein the second set of intensity profile discs is inverted with respect to the identified first set of intensity profile discs;
cause the identified second set of intensity profile discs to be displayed at the determined coordinates on the display device; and
cause the identified first set of intensity profile discs to be displayed on top of the displayed second set of intensity profile discs on the display device.

11. The apparatus according to claim 10, wherein the machine readable instructions are further to cause the processor to:
identify positions along the line;
identify sub-pixel fractional components of each of the identified positions; and
for each of the identified positions, identify, from a group of intensity profile discs, a respective intensity profile disc that corresponds to the identified sub-pixel fractional components to identify the first set of intensity profile discs, wherein each intensity profile disc of the group includes a different intensity profile across an N×N set of pixels and is centered around respective sub-pixel fractional components of the N×N set of pixels, wherein "N" is an integer value greater than one.

12. The apparatus according to claim 11, wherein the machine readable instructions are further to cause the processor to:
in response to a determination that the line has a color other than white and is to be displayed directly on a background section that has a color other than black, generate, for each of the identified intensity profile discs in the first set, a corresponding inverted intensity profile disc having an inverted intensity profile as compared with a respective intensity profile disc; and
identify the plurality of generated inverted intensity profile discs as the second set of intensity profile discs.

13. The apparatus according to claim 10, further comprising:
a display buffer; and wherein the instructions are further to cause the processor to copy the identified second set of intensity profile discs and the identified first set of intensity profile discs to the display buffer to be displayed at integer components of the determined coordinates.

14. The apparatus according to claim 10, wherein, to identify the first set of intensity profile discs and to identify the second set of intensity profile discs, the machine readable instructions are further to cause the processor to:
identify coordinates of a starting position of the line;
identify sub-pixel fractional components of the identified starting position coordinates;
identify an intensity profile disc for the starting position corresponding to the identified sub-pixel fractional components of the identified starting position coordinates;
identify an inverted intensity profile disc of the selected intensity profile disc;
identify coordinates of a next position of the line;
identify sub-pixel fractional components of the identified coordinates of the next position;
identify an intensity profile disc for the next position corresponding to the identified sub-pixel fractional components; and identify an inverted intensity profile disc of the selected intensity profile disc for the next position.

15. The apparatus according to claim 10, wherein the first set of intensity profile discs is selected from a group of intensity profile discs, and wherein each of the intensity profile discs in the group includes an intensity profile disc centered around a different location in an N×N set of pixels, wherein "N" is an integer value greater than one.

16. The apparatus according to claim 15, wherein centers of the intensity profile discs in the group are offset from each other by at least a ⅛th pixel resolution in either or both of two orthogonal axes of the coordinate space.

17. A non-transitory computer readable medium on which is stored computer readable instructions that when executed by a processor, cause the processor to:
   determine coordinates in a coordinate space of a display device at which a line is to be displayed;
   identify a set of intensity profile discs corresponding to the determined coordinates;
   determine whether the line has a color other than white and is to be displayed directly on a background section that has a color other than black; and
   in response to a determination that the line has a color other than white and is to be displayed directly on a background section that has a color other than black,
      identify a set of inverted intensity profile discs having inverted intensity profiles with respect to the identified set of intensity profile discs;
      cause the identified set of inverted intensity profile discs to be displayed at the determined coordinates on the display device; and
      cause the identified set of intensity profile discs to be displayed on top of the displayed set of inverted intensity profile discs on the display device.

18. The non-transitory computer readable storage medium according to claim 17, wherein the machine readable instructions are further to cause the processor to:
   identify positions along the line;
   identify sub-pixel fractional components of each of the identified positions; and
   for each of the identified positions, identify, from a group of intensity profile discs, a respective intensity profile disc that corresponds to the identified sub-pixel fractional components to identify the set of intensity profile discs, wherein each intensity profile disc of the group includes a different intensity profile across an N×N set of pixels and is centered around respective sub-pixel fractional components of the N×N set of pixels, wherein "N" is an integer value greater than one.

19. The non-transitory computer readable storage medium according to claim 17, wherein the machine readable instructions are further to cause the processor to:
   in response to a determination that the line has a white color or is to be displayed directly on a background section that has a black color, cause the identified set of intensity profile discs to be displayed on the display device without identifying the set of inverted intensity profile discs.

20. The non-transitory computer readable storage medium according to claim 17, wherein, to identify the set of intensity profile discs and to identify the set of inverted intensity profile discs, the machine readable instructions are further to cause the processor to:
   identify coordinates of a starting position of the line;
   identify sub-pixel fractional components of the identified starting position coordinates;
   identify an intensity profile disc for the starting position corresponding to the identified sub-pixel fractional components of the identified starting position coordinates;
   identify an inverted intensity profile disc of the identified intensity profile disc;
   identify coordinates of a next position of the line;
   identify sub-pixel fractional components of the identified coordinates of the next position;
   identify an intensity profile disc for the next position corresponding to the identified sub-pixel fractional components; and
   identify an inverted intensity profile disc of the identified intensity profile disc for the next position.

* * * * *